United States Patent [19]

Estrade et al.

[11] 4,367,109

[45] Jan. 4, 1983

[54] PROCESSES FOR MANUFACTURING INNER TUBES OF THE SO-CALLED PUNCTURE-PROOF TYPE FOR VEHICLE WHEELS AND SIMILAR AND PUNCTURE-PROOF INNER TUBES THUS OBTAINED

[75] Inventors: Robert Estrade, Alencon; Jean Michaut, Maisons-Laffite, both of France

[73] Assignee: Hutchinson-Mapa, Paris, France

[21] Appl. No.: 194,892

[22] Filed: Oct. 7, 1980

[30] Foreign Application Priority Data

Oct. 11, 1979 [FR] France ................... 79 25303

[51] Int. Cl.³ ............... B29H 13/00; B32B 31/20
[52] U.S. Cl. ..................... 156/113; 156/119;
156/147; 156/228; 156/245; 156/292; 156/404;
152/165; 152/322; 152/328; 264/46.9; 264/501;
264/516; 264/519; 264/250; 264/294; 264/327;
264/328.3; 425/34 R; 425/37
[58] Field of Search .......... 264/250, 46.9, 294,
264/326, 327, 328.3, 501, 516, 519–521; 425/37,
34 R; 156/110 R, 112, 113, 118–119, 145–147,
228, 245, 292, 404; 152/152, 165, 320, 322, 325,
327–328

[56] References Cited

U.S. PATENT DOCUMENTS

| 1,694,260 | 12/1928 | Hibbert | 152/328 |
| 2,497,226 | 2/1950 | McNeill | 264/250 |
| 2,620,844 | 12/1952 | Lord | 152/326 |
| 2,620,845 | 12/1952 | Lord | 152/328 |
| 4,201,744 | 5/1980 | Makinson | 264/250 |

FOREIGN PATENT DOCUMENTS

| 525499 | 9/1921 | France . |
| 538459 | 6/1922 | France . |
| 543442 | 9/1922 | France . |
| 1058794 | 3/1954 | France . |
| 2350216 | 12/1977 | France . |

*Primary Examiner*—Edward C. Kimlin
*Assistant Examiner*—Lois E. Boland
*Attorney, Agent, or Firm*—Oblon, Fisher, Spivak, McClelland & Maier

[57] ABSTRACT

Inner tubes for pneumatic tires including a toric cushion made from an elastomer material having cells independent of each other.

A process for manufacturing such inner tubes with a mold for preforming and vulcanizing semi-toric elements, the mold includes fingers for molding recessed cavities and an incorporated heating network, the preformed semi-toric elements having undergone a first vulcanization are then joined together and subjected to a second vulcanization in an appropriate apparatus.

14 Claims, 5 Drawing Figures

PROCESSES FOR MANUFACTURING INNER TUBES OF THE SO-CALLED PUNCTURE-PROOF TYPE FOR VEHICLE WHEELS AND SIMILAR AND PUNCTURE-PROOF INNER TUBES THUS OBTAINED

BACKGROUND OF THE INVENTION

1. Field of the Invention

The present invention relates to a new process for manufacturing inner tubes of the so-called puncture-proof type for wheels ensuring carrying or guiding functions for mobile masses and to puncture-proof inner tubes obtained by this process.

2. Description of the Prior Art

Pneumatic tires of the so-called "puncture-proof" type in accordance with the prior art are known. Such pneumatic tires include a toric cushion made from an elastomer material. The toric cushion includes recesses or cells preferably of tubular or cylindrical section, positioned transversely to the tread. Cells are independent of each other, and inflated to a predetermined pressure at the time of manufacture with an appropriate gas. This pressure is fixed at a constant value.

Pneumatic tires of the so-called "puncture-proof" type are also known, which includes a toric cushion as described above but housed into the cover at the base and against the side-walls of said cover so that the upper part of the inner space of the cover is free and inflated to a pressure depending on the requirements of use of the pneumatic tire by means of an external valve connected to the inner space through a supply conduit which passes through the toric cushion. In such pneumatic tires, the pressure can be varied at will.

However, because of their alveolar structure, the so-called puncture-proof inner tubes formed by a toric cushion provided with cells independent of each other, proposed in accordance with the prior art, present difficulties of manufacture; a conventional process for manufacturing these inner tubes consists in forming halves of inner-tube sections, substantially semi-toric in shape, by extrusion for example, then in joining together two symmetrical half-sections thus obtained, by their respective flat faces, by assembling with a solvent, after which the multiple sections thus obtained, necessary for forming the toric cushion are joined together generally also by means of a solvent. The manufacture of a toric cushion with cells, in accordance with the prior art, requires then a multiplicity of operations not only in the manufacture properly speaking but also in the operations for assembly by means of an adhesive, which makes this manufacture long, wasteful of labor and expensive. Moreover, the multiplicity of assembly joints presents a risk of leakage of the pressurized gas contained in the cells and, consequently, a risk of impairing the characteristics proper to this type of inner tube whose value resides precisely in the fact that the presence of a gas under a constant pressure in the cells should make these inner tubes insensitive to perforations.

Attempts have been made to get over these difficulties by proposing so-called puncture-proof inner tubes formed by juxtaposition of two annular elements in the form of semi-tores, by their symmetrical flat faces, these annular elements comprising recessed holes forming cylindrical cells obtained by molding at the same time as the semi-toric annular elements themselves.

It has however proved that the molding process recommended in accordance with the prior art does not in practice allow cells to be obtained, these latter closing up again as soon as the corresponding projections of the mold had been withdrawn from the molded mass.

Consequently, the only technique existing at present for forming, in the half-sections, cylindrical recessed holes which form cylindrical cells when two symmetrical semi-sections are assembled by their flat faces, consists in piercing cylindrical holes in the mass of elastomer. Such a technique requires manual operation and is therefore wasteful of labor; furthermore, manual formation of the recessed holes limits the geometry thereof to the cylindrical form; moreover, it is prejudicial to the regularity of the shape and of the distribution of the cells, and it does not allow a strictly constant repetition of the product, thus causing variations in weight, dimensions and mechanical characteristics of the inner tubes contained.

SUMMARY OF THE INVENTION

Consequently, the aim of the present invention is to provide inner tubes of the so-called puncture-proof type which answer better the requirements of practice than the inner tubes of this type previously known, particularly in that they present cells of any shape adapted to the most diverse and the most extensive uses of these inner tubes, whether they are intended to ensure functions of bearing mobile masses or guiding functions insofar as they are mounted on military vehicles, lorries, tractor-drawn vehicles or motor cars, in that the puncture-proof inner tubes in accordance with the invention comprise cells whose shape, distribution, thickness of walls and dimensions are strictly controlled, in that these puncture-proof inner tubes present in relation to each other a great consistency in weight, dimensions, mechanical characteristics, i.e. optimal reproducibility, and in that the behavior of pneumatic tires equipped with these inner tubes is considerably improved when running flat following a perforation. Moreover, the puncture-proof inner tubes in accordance with the invention, whose cells contain gas at a substantially constant predetermined pressure, are suitable for use not only in association with constant-pressure pneumatic tires but also with variable-pressure pneumatic tires. The above aims are reached through a new manufacturing process also provided by the present invention, which allows puncture-proof inner tubes of the abovementioned type to be manufactured at substantially faster rates than in the prior art, with a reduced labor force and under very considerably improved conditions of economic efficiency, and which allows puncture-proof inner tubes to be obtained in which the number of assembly joints is considerably reduced with respect to the prior art and whose weight, dimensions, and mechanical characteristics are constant.

The present invention provides inner tubes for pneumatic tires of the so-called puncture-proof type, comprising a toric cushion made from an elastomer material comprising cells independent of each other each of which contains a gas at a predetermined pressure, characterized in that they comprise an alveolar structure obtained by molding and in that the cells are continuous on each side of the median plane of the inner tube, ensuring a balanced pressure in the transverse direction of this latter, said cells having all geometrical shapes and dimensions adapted to the requirements, such as cylindrical, prismatic, hexagonal, and honeycomb shapes in particular, in which the regularity of the geometry, the thickness of the walls which define the cells and the distribution of the cells are controlled by vulcanization in the mold, which results in controlling the consistency of the mechanical characteristics of said inner tubes and in improving their balance and their pneumatic flexibility.

The present invention also provides a new process for manufacturing puncture-proof inner tubes of the type formed by a toric cushion made from an elastomer material comprising cells independent of each other each of which contains a gas at a predetermined pressure, which process consists:

in filling a mold with an elastomer for performing annular elements with a semi-toric section, in each of which is provided, by molding, a plurality of recessed cavities, open on the flat face of each semi-toric element;

in subjecting these preformed semi-toric elements to a first vulcanizing operation in the preforming mold, under conditions of time, temperature and distribution of temperatures, adapted to stabilize the elastomer material in its mass and to obtain a good inherent flatness of the plane face of the semi-toric element, while conferring on this face a condition of under-vulcanization;

in removing the thus vulcanized semi-toric elements from the preforming and vulcanizing mold, and introducing them into a second apparatus in which they are subjected to a second vulcanizing operation adapted to assemble said plane faces and to confer on the inner tube its optimum mechanical characteristics.

According to an advantageous embodiment of the process of the present invention, the preformed semi-toric elements are subjected to a first vulcanizing operation at a temperature possibly reaching 170° C. to 200° C., for five minutes to one hour.

According to another advantageous embodiment of the process which forms the subject matter of the present invention, the heat of the first vulcanizing operation is distributed appropriately homogeneously in the mass to be molded, by means of the preforming mold which comprises for this purpose an incorporated heating network, except for the plane face of the mold which does not comprise any heating means.

In accordance with the present invention, the preformed semi-toric elements having undergone a first vulcanizing operation are removed mechanically from the mold by separating the female part of the mold from the rest thereof, then by separating the closure plate of said female part from the male part of the mold.

According to another advantageous embodiment of the process which forms the subject matter of the present invention, the joining up of the respective plane faces of two corresponding semi-toric elements is achieved conjointly with a second vulcanizing operation in a second mold, in an atmosphere of a pressurized gas, by clamping and compressing the faces to be welded by progressive heating possibly reaching 200° C. at the end of the operation, for a period of a few minutes to one to several hours.

According to yet another advantageous embodiment of the process which forms the subject matter of the present invention, the joining up of the respective plane faces of two corresponding semi-toric elements is carried out during a first step during which the preformed semi-tores which have undergone a first vulcanizing operation are placed in the two facing shells of a second mold, in that this second mold is then sealingly closed, then pressurized with an inert gas, after which the two semi-tores are mechanically compressed one against the other by complete closing and locking of the second mold in a closed position; the second vulcanizing operation is carried out during a second step during which said locked second mold, containing the joined toric element, is heated for a few minutes to one to several hours at a temperature possibly reaching 170° to 200° C., by appropriate means such as heating plates, drying oven, introduction of steam into the mold, application of high-frequency or ultra-high frequency energy, etc.

According to an advantageous feature of the invention, the inert gas introduced into the second mold is pressurized and maintained at a pressure of 0.5 to 10 bars.

The present invention provides furthermore a mold for preforming and vulcanizing semi-toric elements whose joining up during a later step of the process such as defined above gives rise to an inner tube of the so-called puncture-proof type. This mold is characterized in that it comprises a half-shell female part the filling of which is achieved in a known way through transfer channels, a plate for closing the plane face of the half-shell, a male part which bears fingers for molding cavities in the mass of the elastomer material which fills the female half-shell, a heating network incorporated, on the one hand, in the female part of the mold and, on the other hand, in the fingers for molding the cavities, except for the closure plate of the mold which does not comprise any heating means.

In accordance with the invention, said heating network is formed by a fluid circuit incorporated in the mold and heated to a temperature possibly reaching 170° C. to 200° C., associated with a device for regulating the temperature.

According to another feature of the invention, the heating network is formed by an electric resistance heating network incorporated in the mold.

Besides the preceding arrangements, the invention comprises further arrangements which will become clear from the following description.

DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 3 represents a first operating stage of the second mold, i.e. the stage of placing two semi-toric elements removed from the first mold shown in FIGS. 1 and 2, in each of the facing parts of said second mold;

FIG. 4 represents a second operating stage of the second mold, i.e. the stage of introducing and pressurizing an inert gas in said second mold, and FIG. 5 represents the stage of joining up two facing semi-toric elements in the two parts of said second mold.

Figure 1:
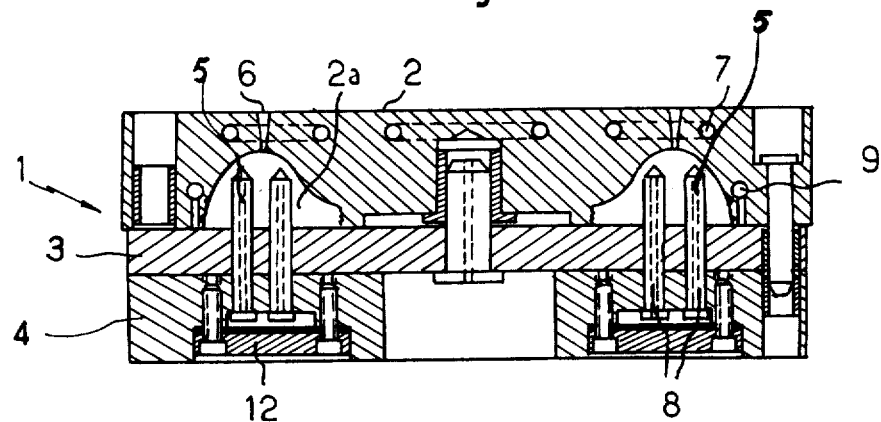
FIG. 1 is a sectional view along A—A of FIG. 2, of a mold for preforming and vulcanizing semi-toric elements in accordance with the present invention.

It will be readily understood however that these drawings and the corresponding descriptive parts are given solely by way of illustration of the subject of the invention, and that they form in no way a limitation thereof.

DETAILED DESCRIPTION OF THE PREFERRED EMBODIMENTS

The process and the molding apparatus in accordance with the present invention allow a puncture-proof inner tube made from an elastomer to be obtained, comprising cells isolated from each other, by molding two semi-toric elements which are then joined together solely along their plane surfaces, thus avoiding the construction of semi-sections assembled into a section by bonding, then the joining up of the multiple sections thus obtained end to end to obtain the desired inner tube, and the resulting presence of a multiplicity of assembly joints. This simplification of the manufacturing technique and the improvement in the characteristics of the inner tubes formed by this technique are essentially obtained through the combination of a molding procedure with a first vulcanizing procedure at a temperature possibly reaching 170 and even 200° C., which is applied for a few minutes to one hour and which is sufficient to provide the desired dimensional stabilization of the half-shell obtained, in its density, and to ensure a good flatness of the plane face of said half-shell, but insufficient to cause this face to lose its good chacteristics of weldability.

However, the provision of such prevulcanization requires special heating conditions, since the conventional methods of heating molds by means of a plate or in an autoclave do not allow the precise control of the vulcanizing required by the process of the invention. This is why, in accordance with the invention, the preforming and first vulcanizing mold is not heated from outside, but comprises its own incorporated heating network which affects the outer half-shell 2 of the mold and the fingers 5 for molding the cavities, but excludes the closure plate 3 of the plane face.

The heating network 7-8 incorporated in mold 1 is advantageously formed by a flow of heating fluid, steam or oil for example, brought to a temperature which may reach 170° to 200° C., which provides the first desired vulcanization of the preformed elastomer in mold 1. Equivalent results may however be obtained by substituting for this fluid-circulation heating network an electric resistance heating.

Figure 2:
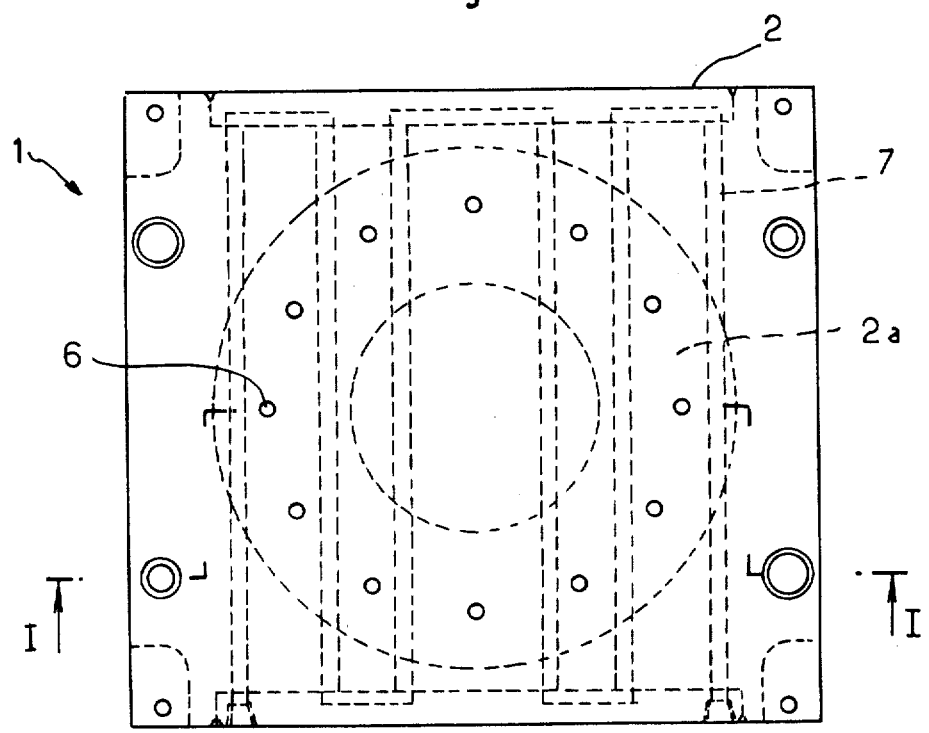
FIG. 2 is a top view of a mold for preforming and vulcanizing semi-toric elements in accordance with the present invention.
Figure 3:
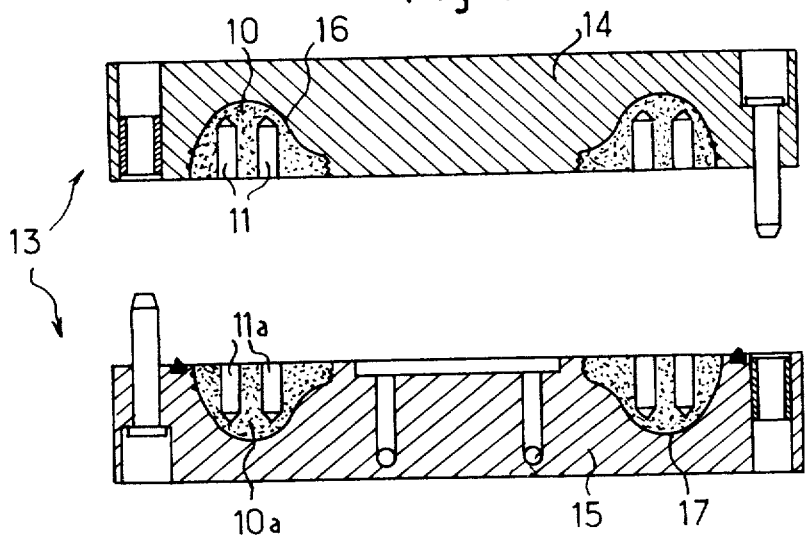
FIGS. 3 to 5 represent in section the second mold in which the joining up and the final vulcanization of a toric cellular inner tube is carried out in accordance with the invention, and in particular.
Figure 4:
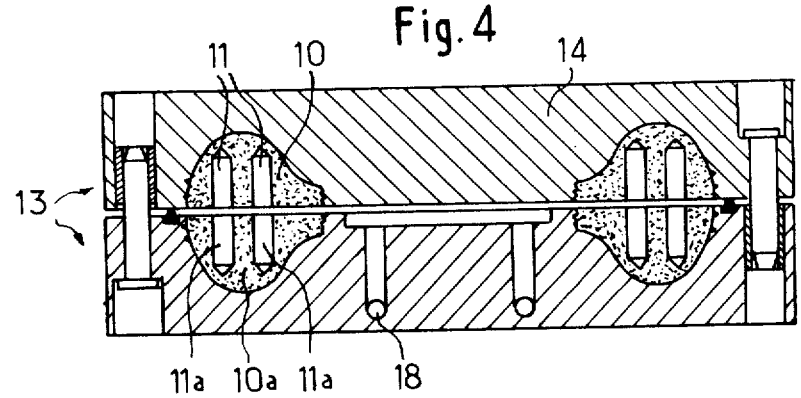
Figure 5:
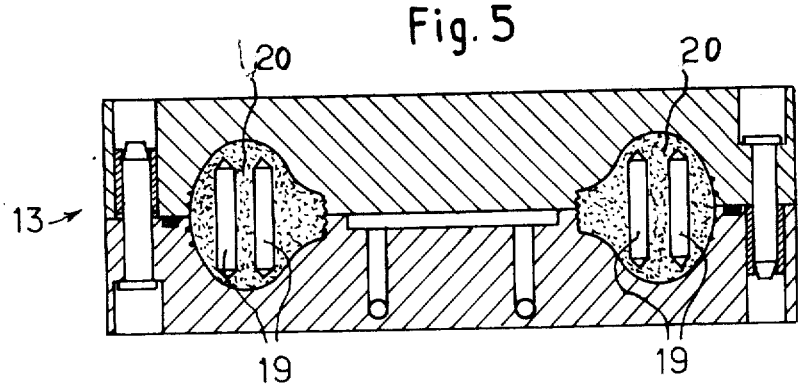

The preforming and first vulcanizing mold 1 shown by way of non-limiting example in FIGS. 1 and 2, comprises a female part 2 which comprises a half-shell 2a whose plane face is closed by a plate 3 and a male part 4 which carries fingers 5 for molding the semi-cavities 11 of a semi-toric element 10.

The elastomer material is injected into the half-shell 2a through transfer channels 6, preferably under a vacuum which is obtained by means of the vacuum header 9.

By making the lower plate 12 of the male part 4 of mold 1 independent of fingers 5, removal of the preformed piece 10 from the mold is facilitated, by mechanical extraction of fingers 5, then separation of the assembly 3-4 and of the female part 2, the preformed piece 10 remaining on plate 3, then separation of plate 3 and the male part 4, the preformed half-shell 10 resting simply on plate 3.

After removal of two half-shells 10, 10a from molds 1 in which they have been preformed and have undergone a first vulcanization, they are introduced into a second apparatus designated generally by the reference numeral 13, formed by two parts 14 and 15 disposed facing each other, in which there is provided an impression 16-17 intended to receive a half-shell 10, 10a, respectively, each of which comprises cavities 11, 11a.

Closing of this mold 13 is preferably carried out in two stages:

in a first stage it is incompletely closed over a seal which allows a pressurized inert gas, such as nitrogen for example, to be introduced at 18 in order to pressurize the two half-shells 10, 10a and the semi-cavities 11, 11a;

once this pressurization has been achieved, the mold is completely closed by clamping and compressing the weld surfaces, while checking that the nitrogen pressure is maintained.

The second vulcanization treatment is carried out in a way known per se at temperatures which may reach 170° to 200° C., by using known apparatues, such as heating plates, autoclave press, oven, direct heating by means of steam introduced into cavities of the mold, application of high-frequency or ultra-high frequency energy or by using any other equivalent means adapted to provide the desired second vulcanization, so as to ensure the dimensional stabilization of the two assembled semi-tores in order to form a structure 20 comprising cells 19.

The elastomer material used for constructing the puncture-proof inner tubes in accordance with the present invention, must have mechanical characteristics adapted to the uses for which pneumatic units equipped with said inner tubes are intended and particularly to the inflation pressure of the cells and/or of the cover. It must then preferably be chosen among the elastomer materials having a compact or cellular structure.

It follows from what has gone before that whatever the modes of embodiment, construction and application adopted, a process is obtained for manufacturing puncture-proof inner tubes of the type comprising cells isolated from each other containing a gas at a predetermined pressure, which requires substantially less handling operations than the processes known in the prior art, and allows a considerable reduction in labor costs, this process providing puncture-proof inner tubes which present a very wide range of uses, ensure much better behavior of the pneumatic tire with which they are associated, because of their greater reliability due, on the one hand to the practically total elimination of risks of leaking of the gas occluded in the cells and, on the other hand, to a better distribution of the masses, connected with the homogeneity of the shape and of the dimensions of the cells which results from the technique used, i.e. the combination of molding and a prevulcanization procedure, which guarantees the constancy of the pressure of the gas in the cells.

As is evident from what has gone before, the invention is in no way limited to those of its modes of embodiment, construction and application which have just been described more explicitly; it embraces on the contrary all variations thereof which may occur to the mind of a man skilled in the art, without departing from the scope or spirit of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A process for manufacturing an inner tube for a puncture-proof tire formed by a toric cushion made from an elastomer material comprising independent cells containing therein a gas at a predetermined pressure, said toric cushion being preformed in a preforming mold comprising a male portion, a female portion having heating means and a flat closure plate separate and separable from said male portion and said female portion and disposed therebetween, said female portion having a semi-toric cavity formed therein and having a plane face formed by said flat closure plate, said toric cushion being subsequently vulcanized in a vulcanizing apparatus separate and different from said preforming mold and having first and second mutually facing shells, wherein said method comprises:
    filling said cavity of said female portion of said preforming mold with said elastomer material, said cavity of said female portion being closed by said flat closure plate;
    preforming within said preforming mold a substantially semi-toric element having a flat face;
    molding a plurality of recessed cavities within said semi-toric element within said preforming mold such that said cavities are open on said flat face of said semi-toric element;
    undervulcanizing said flat face on said semi-toric element while contacting said flat face with said flat closure plate;
    performing a first vulcanizing operation on said semi-toric element in said preforming mold under predetermined conditions of time, temperature and temperature distribution so as to stabilize the dimensions of said semi-toric element and to obtain an even flatness on said flat undervulcanized face of said semi-toric element;
    removing said semi-toric element from said preforming mold to obtain a first undervulcanized semi-toric element;
    forming a second undervulcanized semi-toric element;
    introducing said first and second semi-toric elements into said separate vulcanizing apparatus; and
    subjecting said first and said second semi-toric elements to a second vulcanizing operation for assembling said flat undervulcanized faces of said first and second semi-toric elements to form said toric cushion having optimum mechanical characteristics.

2. The process of claim 1 wherein said predetermined conditions of said first vulcanizing operation further comprise maintaining said temperature between 170° C. to 200° C. for five minutes to one hour.

3. The process of claim 1 wherein said first vulcanizing operation further comprises homogeneously heating said semi-toric element in said preforming mold exclusive of said flat closure plate.

4. The process of claim 1 wherein removing said semi-toric element from said preforming mold further comprises first separating said female portion from said flat closure plate and said male portion, then separating said flat closure plate from said male portion.

5. The process of claim 1 wherein said second vulcanizing operation further comprises:
    introducing said gas at said predetermined pressure into said vulcanizing apparatus;
    compressing and clamping together said flat faces of said first and second semi-toric elements; and
    welding together said flat faces of said first and second semi-toric elements by progressive heating up to a temperature of 200° C. for a period of several minutes to several hours.

6. The process of claim 1 which further comprises:
    placing said first and second semi-toric elements in said first and second mutually facing shells of said separate vulcanizing apparatus;
    sealingly closing said first and second shells of said vulcanizing apparatus;
    pressurizing said first and second shells of said vulcanizing apparatus with said gas at a predetermined pressure;
    mechanically compressing together said first and second semi-toric elements with said first and second shells of said vulcanizing apparatus;
    locking together said first and second shells of said vulcanizing apparatus;
    welding together said first and second semi-toric elements at a temperature between 170° C. and 200° C. for several minutes to several hours.

7. The process of claim 5 which further comprises maintaining said inert gas at said predetermined pressure between 0.5 to 10 bars.

8. The process of claim 6 which further comprises maintaining said inert gas at said predetermined pressure between 0.5 to 10 bars.

9. A process for manufacturing an inner tube for a puncture-proof tire formed by a toric cushion made from an elastomer material, said toric cushion comprising independent cells containing therein a gas at a predetermined pressure and being preformed in a preforming mold comprising a male portion, a female portion having heating means and a flat closure plate separate and separable from said male portion and said female portion and disposed therebetween, said female portion having a semi-toric cavity formed therein and having a plane face formed by said flat closure plate, said toric cushion being subsequently vulcanized in a vulcanizing apparatus separate and different from said preforming mold and having first and second mutually facing shells and having intake means for admitting said gas into said vulcanizing apparatus, wherein said method comprises:
    filling said cavity of said female portion of said preforming mold closed by said flat closure plate with said elastomeric material;
    preforming within said preforming mold a substantially semi-toric element having a flat face;
    molding a plurality of recessed cavities within said semi-toric element within said preforming mold such that said cavities are open on said flat face of said semi-toric element;
    undervulcanizing said flat face on said semi-toric element while contacting said flat face with said flat closure plate;
    performing a first vulcanizing operation on said semi-toric element in said performing mold under predetermined conditions of time, temperature and temperature distribution so as to stabilize the dimensions of said semi-toric element and to obtain an even flatness on said flat undervulcanized face of said semi-toric element;

removing said semi-toric element from said preforming mold by first separating said female portion from said flat closure plate and said male portion, then separating said flat closure plate from said male portion to obtain a first undervulcanized semi-toric element;

forming a second undervulcanized semi-toric element;

introducing said first and second semi-toric elements into said separate vulcanizing apparatus; and subjecting said first and said second semi-toric elements to a second vulcanizing operation for assembling said flat undervulcanized faces of said first and second semi-toric elements to form said toric cushion having optimum mechanical characteristics.

10. A process for manufacturing an inner tube for a puncture-proof tire formed by a toric cushion made from an elastomer material, said toric cushion comprising independent cells containing therein a gas at a predetermined pressure, said toric cushion being preformed in a preforming mold comprising a male portion, a female portion having heating means and a flat closure plate separate and separable from said male portion and said female portion and having a semi-toric cavity formed therein and having a plane face formed by said flat closure plate, said toric cushion being subsequently vulcanized in a vulcanizing apparatus separate and different from said preforming mold and having a first and second mutually facing shells and having intake means for admitting said gas into said vulcanizing apparatus, wherein said method comprises:

filling said cavity of said female portion of said preforming mold closed by said flat closure plate with said elastomer material;

preforming within said preforming mold a substantially semi-toric element having a flat face;

molding a plurality of recessed cavities within said semi-toric element within said preforming mold such that said cavities are open on said flat face of said semi-toric element;

undervulcanizing said flat face on said semi-toric element while contacting said flat face of said semi-toric element with said flat closure plate;

performing a first vulcanizing operation on said semi-toric element in said preforming mold under predetermined conditions of time, temperature and temperature distribution so as to stabilize the dimensions of said semi-toric element and to obtain an even flatness on said flat undervulcanized face of said semi-toric element;

removing said semi-toric element from said preforming mold to obtain a first undervulcanized semi-toric element;

forming a second undervulcanized semi-toric element;

introducing said first and second semi-toric elements into said separate vulcanizing apparatus;

subjecting said first and said second semi-toric elements to a second vulcanizing operation for assembling said flat undervulcanized faces of said first and second semi-toric elements to form said toric cushion having optimum mechanical characteristics;

introducing said gas at said predetermined pressure into said vulcanizing apparatus through said intake means;

compressing and clamping together said flat faces of said first and second semi-toric elements; and welding together said flat faces of said first and second semi-toric elements by progressive heating up to a temperature of 200° C. for a period of several minutes to several hours.

11. An apparatus for manufacturing a puncture-proof pneumatic tire inner tube formed by first and second semi-toric elements joined to form a toric cushion made from an elastomeric material and having a plurality of independent cells formed therein, said cells containing a gas at a predetermined pressure, wherein said apparatus comprises:

a first mold for preforming said semi-toric elements wherein said first mold further comprises;

a female portion in the form of a half-shell having an open plane face, and having a plurality of transfer channels formed therein for introducing said elastomer material into said first mold;

a male portion provided with a plurality of fingers for molding said cells;

a plate separate and separable from said male portion and said female portion of said first mold for closing said open plane face of said half-shell of said female portion and for forming a flat face on each of said semi-toric elements;

a heating network provided in said female portion of said first mold and in said plurality of fingers provided on said male portion, to the exclusion of said closure plate; and a second mold separate from said first mold for joining and vulcanizing said first and second semi-toric elements to form said toric cushion.

12. The apparatus as claimed in claim 11 wherein said heating network further comprises:

a fluid circuit having a fluid heated to a temperature between 170° to 200° C.; and a device operatively associated with said fluid circuit for regulating said temperature.

13. The apparatus as claimed in claim 11 wherein said heating network further comprises electric resistance heating means.

14. The apparatus as claimed in claim 11 wherein said second mold further comprises:

first and second mold portions disposed in a facing relationship, each mold portion having an impression formed therein for respectively receiving said first and second semi-toric elements;

intake means for admitting said gas into said second mold operatively associated with said second mold;

means for sealingly closing said second mold and being operatively associated with said first and second mold portions such that said closing is effected by clamping together said first and second mold portions;

means for locking together said first and second mold portions operatively associated with said second mold; and means for heating said second mold for joining together said first and second semi-toric elements along said flat faces of said semi-toric elements to form said toric cushion.

* * * * *